(12) United States Patent
Miyazaki et al.

(10) Patent No.: US 7,652,442 B2
(45) Date of Patent: Jan. 26, 2010

(54) ELECTRIC TOOL SWITCH MECHANISM

(75) Inventors: Hiroshi Miyazaki, Hikone (JP);
Toshiharu Ohashi, Maibara (JP)

(73) Assignee: Matsushitu Electric Works, Ltd.,
Osaka (JP)

( * ) Notice: Subject to any disclaimer, the term of this patent is extended or adjusted under 35 U.S.C. 154(b) by 334 days.

(21) Appl. No.: 11/819,538

(22) Filed: Jun. 28, 2007

(65) Prior Publication Data

US 2008/0042607 A1   Feb. 21, 2008

(30) Foreign Application Priority Data

Jun. 29, 2006   (JP) .............................. 2006-180261

(51) Int. Cl.
*H02P 7/29* (2006.01)
*H02P 7/00* (2006.01)

(52) U.S. Cl. ...................... 318/432; 318/430; 318/433; 318/376; 388/937; 227/2; 227/134; 173/217

(58) Field of Classification Search ................. 318/430, 318/432, 433, 381, 376; 388/937; 227/2, 227/134; 173/217
See application file for complete search history.

(56) References Cited

U.S. PATENT DOCUMENTS

| | | | | |
|---|---|---|---|---|
| 4,704,570 A | * | 11/1987 | Hopkins ...................... 318/729 |
| 5,220,634 A | * | 6/1993 | Yaguchi et al. ............. 388/819 |
| 5,416,885 A | | 5/1995 | Sakoh et al. |
| 5,657,417 A | * | 8/1997 | Di Troia ...................... 388/829 |
| 5,738,177 A | * | 4/1998 | Schell et al. ................. 173/178 |
| 5,821,709 A | * | 10/1998 | Omori et al. ............. 318/400.6 |
| 6,107,762 A | * | 8/2000 | Schauer ....................... 318/245 |
| 6,424,112 B1 | * | 7/2002 | Schauer ....................... 318/599 |
| 6,566,843 B2 | * | 5/2003 | Takano et al. ................ 320/114 |
| 6,598,684 B2 | * | 7/2003 | Watanabe ....................... 173/2 |
| 6,741,051 B2 | * | 5/2004 | Chu ........................... 318/376 |
| 7,023,159 B2 | * | 4/2006 | Gorti et al. ................... 318/432 |
| 7,496,460 B2 | * | 2/2009 | Hornick et al. ............... 702/64 |
| 2002/0149345 A1 | * | 10/2002 | Takano et al. ................ 320/137 |
| 2003/0149508 A1 | * | 8/2003 | Watanabe .................... 700/168 |
| 2004/0075408 A1 | * | 4/2004 | Gorti et al. ................... 318/381 |
| 2005/0052145 A1 | * | 3/2005 | Carrier et al. ................ 318/381 |
| 2006/0214627 A1 | * | 9/2006 | Ito et al. ...................... 320/107 |
| 2007/0126407 A1 | * | 6/2007 | Loong ......................... 323/210 |
| 2008/0024077 A1 | * | 1/2008 | Bernier et al. ............... 318/115 |
| 2008/0059000 A1 | * | 3/2008 | Hornick et al. .............. 700/297 |
| 2008/0059089 A1 | * | 3/2008 | Hornick et al. ................ 702/63 |
| 2009/0071675 A1 | * | 3/2009 | Hanawa et al. .............. 173/217 |

FOREIGN PATENT DOCUMENTS

JP   2000-024960   1/2000

* cited by examiner

*Primary Examiner*—Paul Ip
(74) *Attorney, Agent, or Firm*—Bacon & Thomas, PLLC

(57) ABSTRACT

An electric tool switch mechanism includes a trigger switch for operating to at least rotate or stop a DC motor; and a power switch connected between the DC motor and a battery power source and closed when a pressed amount of the trigger switch exceeds a predetermined threshold value. The mechanism further includes a switching device connected between the DC motor and the battery power source via the power switch; a control circuit for controlling to turn the switching device on/off using a desired on-duty when the pressed amount of the trigger switch exceeds the threshold value; and a stopping unit that is controlled by the trigger switch for forcibly turning the switching device off before the power switch is changed from on to off when the trigger switch is released.

3 Claims, 5 Drawing Sheets

ELECTRIC TOOL SWITCH MECHANISM

FIELD OF THE INVENTION

The present invention relates to an electric tool switch mechanism that controls a rotational speed of an output shaft depending on a pressed amount of a trigger switch.

BACKGROUND OF THE INVENTION

A conventional electric tool switch mechanism includes a power-source contact switch connected in series with a DC motor and a battery power source, a trigger switch for determining a rotational speed of the DC motor depending on a pressed amount, a semiconductor switching device connected in series with the DC motor and the battery power source via the power-source contact switch, a second contact switch connected in parallel with the semiconductor switching device, and a control circuit for receiving a power voltage via the power-source contact switch and controlling on/off of the semiconductor switching device (see Japanese Patent Laid-open Application No. Hei 6-14576, pages 4 and 5 and FIG. 3).

In the electric tool switch mechanism, when the trigger switch is slightly pressed, the power-source contact switch is on and an operation voltage is supplied to the control circuit. In this case, the control circuit increases or decreases an on-duty of the semiconductor switching device depending on the pressed amount of a trigger switch in order to rotate the DC motor at a speed dependent on the pressed amount. When the trigger switch is pressed at its maximum, the second contact switch becomes on and bypasses the semiconductor switching device so that the power voltage is directly supplied to the DC motor. This prevents any possible loss incurred by internal resistance of the semiconductor switching device.

When the trigger switch is released to stop the rotation of the DC motor and the power-source contact switch is changed from on to off in the state where the semiconductor switching device remains powered on, an arc is generated at the power-source contact switch and the lifetime of the switch contact is reduced. Accordingly, in the conventional electric tool switch mechanism, when the pressed amount of the trigger switch is below a predetermined reference value, the on-duty of the semiconductor switching device is made 0% before the power-source contact switch is changed from on to off, so that the power-source contact switch is changed from on to off in the state where the semiconductor switching device is off.

When the electric tool switch mechanism is continuously used in the state where the trigger switch is fully pressed, the battery is over-discharged. Accordingly, a voltage detecting circuit for detecting the battery voltage is provided, and a central processing unit (CPU) in the control circuit forcibly turns the switching device off when the battery voltage detected by the voltage detecting circuit is below the predetermined reference value, in order to prevent over-discharge of the battery. However, as a user fully presses the trigger switch, the second contact switch connected in parallel with the semiconductor switching device is closed such that discharge current flows through the second contact switch, thereby over-discharging the battery.

Furthermore, in the case where the control circuit increases or decreases the on-duty of the semiconductor switching device depending on the pressed amount of a trigger switch, the on-duty of the semiconductor switching device is obtained by converting the pressed amount of the trigger switch into a voltage value, averaging it, removing noise from the voltage value, and performing operation on the voltage value. This increases an operation time in the CPU of the control circuit. Accordingly, even though the power-source contact switch is changed from on to off as the trigger switch is released, the on-duty of the semiconductor switching device may not be made 0% due to voltage measurement or operation delay. If the semiconductor switching device remains turned on when the power-source contact switch is changed from on to off, the switch contact opens in the state where current is flowing through the power-source contact switch, thereby generating an arc and reducing the lifetime of the contact.

SUMMARY OF THE INVENTION

The present invention is made in light of the aforementioned problems. It is an object of the present invention to provide an electric tool switch mechanism capable of preventing the generation of an arc when a contact opens and preventing over-discharge of a battery power source.

In accordance with the present invention, there is provided an electric tool switch mechanism including a trigger switch for operating to at least rotate or stop a DC motor; a power switch connected between the DC motor and a battery power source and closed when a pressed amount of the trigger switch exceeds a predetermined threshold value; a switching device connected between the DC motor and the battery power source via the power switch; a control circuit for controlling to turn the switching device on/off using a desired on-duty when the pressed amount of the trigger switch exceeds the threshold value; and a stopping unit controlled by the trigger switch for forcibly turning the switching device off before the power switch is changed from on to off when the trigger switch is released.

Accordingly, when the trigger switch is fully pressed, the supply of a power voltage to the DC motor can be certainly blocked by turning the switching device off because there is no switch for bypassing the switching device. For example, the supply of a power voltage to the DC motor can be certainly blocked by turning the switching device off when overcurrent is detected, thereby preventing over-discharge of the battery. In addition, the stopping unit interlocks with the trigger switch to forcibly turn the switching device off before the power switch is changed from on to off. Thus, the power switch can be changed from on to off in the state where the switching device is off, i.e., the current does not flow through the DC motor. As a result, the generation of an arc can be prevented and the lifetime of the contact can increase.

In accordance with the present invention, it may be preferable that the stopping unit includes a changeover switch that is controlled by the trigger switch, and the changeover switch is configured to change, before the power switch is changed from on to off, a connection of a control terminal of the switching device, which is for receiving a control voltage from the control circuit, from an output of the control circuit to a circuit ground.

Accordingly, since the changeover switch as the stopping unit connects the control terminal of the switching device to the ground of the circuit before the power switch is changed from on to off, the control voltage input from the control circuit to the control terminal of the switching device can be discharged in a short time so that the switching device is forcibly turned off. This allows the power switch to be changed from on to off in the state where the switching device is certainly turned off so that the generation of an arc is prevented and the lifetime of the contact can increase.

In accordance with the present invention, it may be preferable that the switch mechanism further includes a discharging path for discharging a control voltage input from the control circuit to a control terminal of the switching device, wherein the stopping unit includes a changeover switch that is controlled by the trigger switch, and the changeover switch is configured to change, before the power switch is changed from on to off, a connection of a control terminal of the switching device from an output of the control circuit to a state where an electrical circuit between a control terminal and an output of the control circuit is blocked.

Accordingly, since the changeover switch as the stopping unit blocks the electrical circuit between the control terminal of the switching device and the output of the control circuit before the power switch is changed from on to off, the control voltage input from the control circuit to the control terminal of the switching device can be discharged in a short time via the discharging path, so that the switching device is forcibly turned off. This allows the power switch to be changed from on to off in the state where the switching device is certainly turned off so that the generation of an arc is prevented and the lifetime of the contact can increase.

BRIEF DESCRIPTION OF THE DRAWINGS

The above and other objects and features of the present invention will become apparent from the following description of embodiments given in conjunction with the accompanying drawings, in which.

DETAILED DESCRIPTION OF THE EMBODIMENTS

Figure 1:
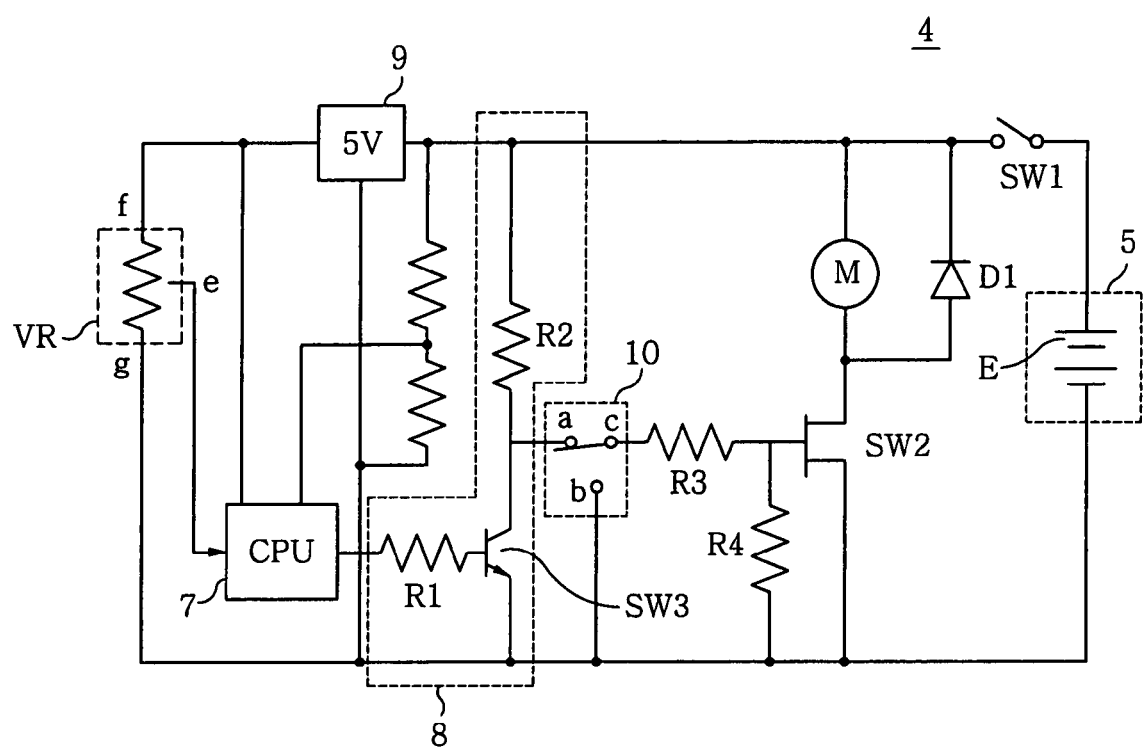
FIG. 1 is a circuit diagram illustrating an electric tool switch mechanism according to a first embodiment of the present invention.

Hereinafter, embodiments of the present invention will be described in detail with reference to the accompanying drawings so that they can be readily implemented by those skilled in the art.

First Embodiment

The first embodiment of the present invention will be described with reference to FIGS. 1 to 6. FIG. 2 is a schematic diagram illustrating an electric tool having a switch device in accordance with the first embodiment of the present invention. The electric tool includes a DC motor M, a decelerator 2 for decelerating the rotation of the DC motor M and transmitting a rotational force to an output shaft 3, and a driving circuit 4 for controlling the rotation of the DC motor M, all of which are accommodated in a tool body 1 having a handheld size.

A battery pack 5 having a battery E such as a rechargeable battery therein is detachably mounted to the tool body 1. The output shaft 3 has a chuck to which a bit (i.e., a rotatable tool) such as a driver, a socket, or a drill is detachably mounted, and which can rotate the bit by rotating the DC motor M. The electric tool further includes a trigger switch 6 disposed at a position allowing a user's finger to reach into a gripping portion 1a of the tool body 1, to set a rotational speed of the DC motor M depending on a pressed amount.

Figure 2:
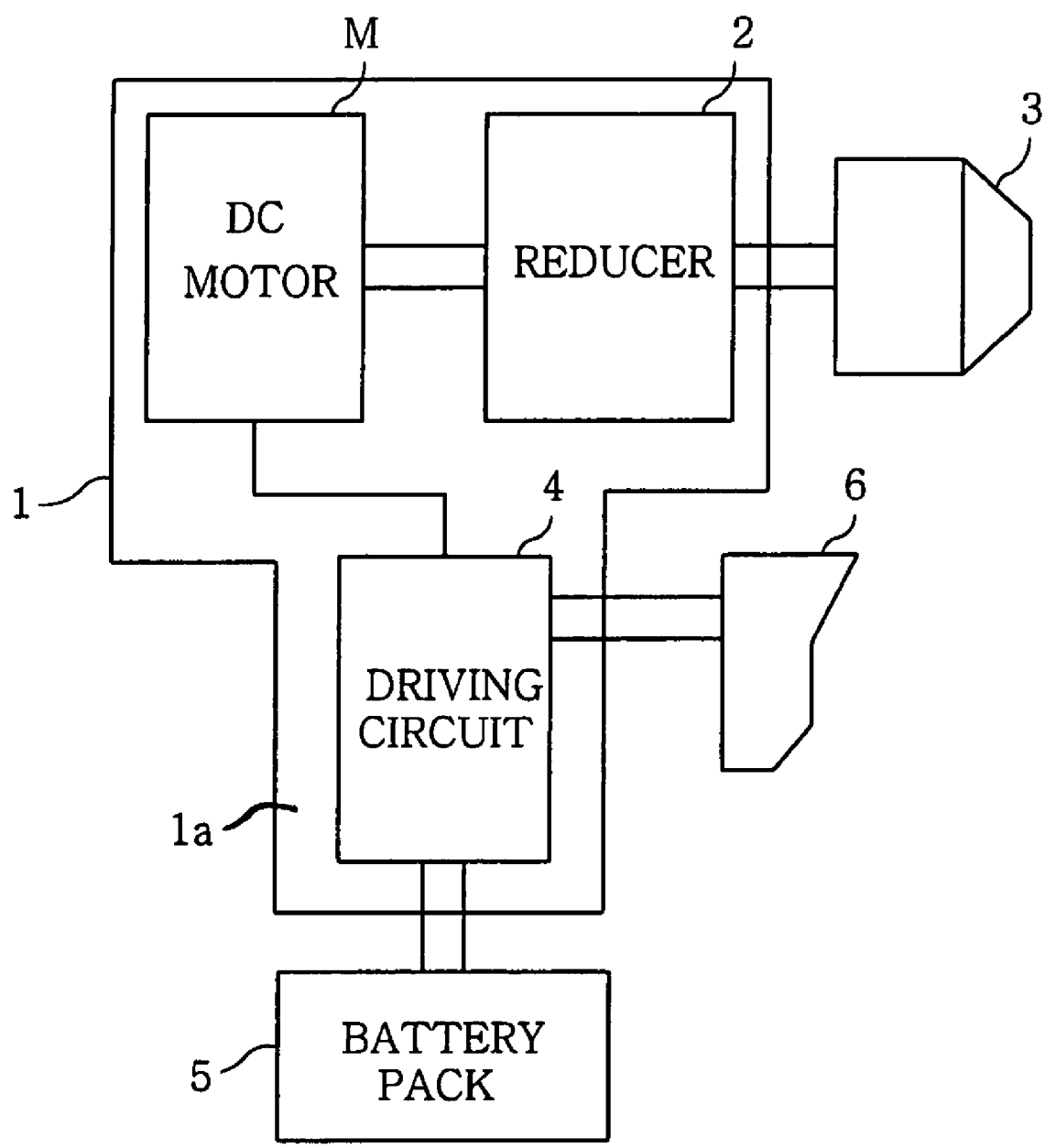
FIG. 2 is a schematic diagram illustrating an electric tool having the switch device shown in FIG. 1.

FIG. 1 is a circuit diagram of the driving circuit 4. The driving circuit 4 includes a power switch SW1 connected between the DC motor M and the battery E and closed when the pressed amount of the trigger switch 6 exceeds a predetermined threshold value, a recovery diode D1 connected in parallel with the DC motor M and in a reverse direction, a switching device SW2 such as a field effect transistor (FET) connected between the DC motor M and the battery E via the power switch SW1, a variable resistor VR having resistance varying with the pressed amount of the trigger switch 6, a CPU 7 for outputting a control signal of on-duty dependent on a change in the resistance of the variable resistor VR (i.e., the pressed amount of the trigger switch 6), a drive circuit 8 for amplifying the control signal output from the CPU 7 and turning the switching device SW2 on/off, and a 3-terminal regulator 9 for dropping and smoothing a DC voltage supplied from the battery E via the power switch SW1 to generate an operational voltage (e.g., DC 5V) for the CPU 7 and the like. Here, the CPU 7 and the drive circuit 8 include a control circuit for controlling the on and off of the switching device.

The drive circuit 8 includes a resistor R2 having one terminal connected to a positive electrode of the battery E via the power switch SW1, and a switching device SW3 consisting of an npn transistor having a collector connected to the other terminal of the resistor R2, an emitter connected to a negative terminal of the battery E, and a base connected to an output of the CPU 7 via a resistor R1. An output of the drive circuit 8 (i.e., a connection point of the resistor R2 and the switching device SW3) is connected to a gate of the switching device SW2 via a changeover switch 10 and a resistor R3. A resistor R4 is connected between the gate of the switching device SW2 and the negative terminal of the battery E. The changeover switch 10 interlocks with the trigger switch 6, and has a common terminal c connected to one terminal of the resistor R3, one switching terminal a connected to the connection point between the resistor R2 and the switching device SW3, and the other switching terminal b connected to the negative terminal of the battery E.

Here, when a low level signal is output from the CPU 7 in the state where the power switch SW1 is closed and the changeover switch 10 is switched to the switching terminal a, the switching device SW3 is turned off and the switching device SW2 is turned on. Accordingly, current is supplied from the battery E to the DC motor M. Meanwhile, when a high level signal is output from the CPU 7, the switching device SW3 is turned on and the switching device SW2 is turned off. Accordingly, current flowing through the DC motor M is blocked. In this manner, when the control signal of on-duty dependent on the resistance of the variable resistor VR is output from the CPU 7, the switching device SW2 is turned on/off. As a result, the DC motor M can rotate at a rotational speed dependent on the pressed amount of the trigger switch 6.

As described above, the power switch SW1 and the changeover switch 10 become on/off in response to the pressing operation of the trigger switch 6, and the resistance of the variable resistor VR varies with the pressed amount of the trigger switch 6. The structures of the changeover switch 10 and the variable resistor VR are described based on FIGS. 3 to 5.

Figure 3:
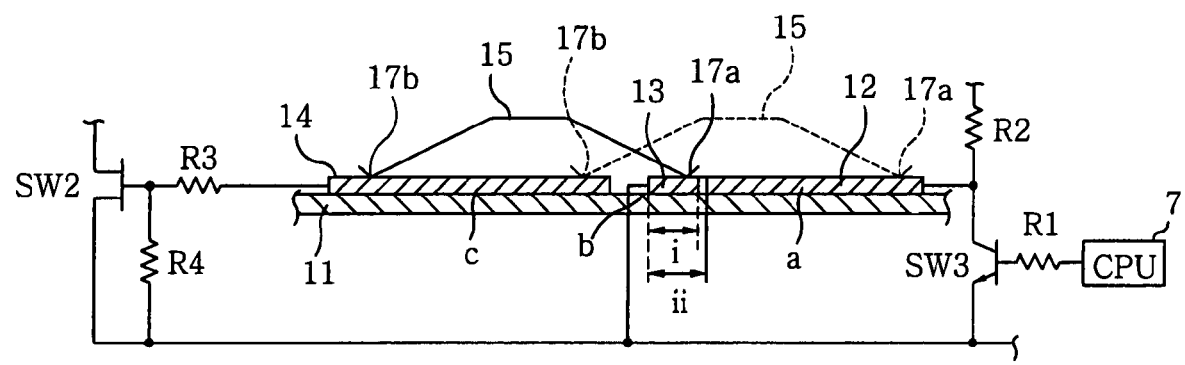
FIG. 3 is a schematic view illustrating a changeover switch for the switch device.

FIG. 3 is a schematic cross-sectional view illustrating the changeover switch 10. The changeover switch 10 comprises a base 11 having conductor patterns 12, 13, and 14 formed on a surface thereof and having resistance of approximately zero; and a sliding member 15 to be slid on the base 11 in response to the pressing operation of the trigger switch 6 to connect or disconnect between the conductor pattern 14 and the conductor pattern 12 and between the conductor pattern 14 and the conductor pattern 13.

Figure 5:
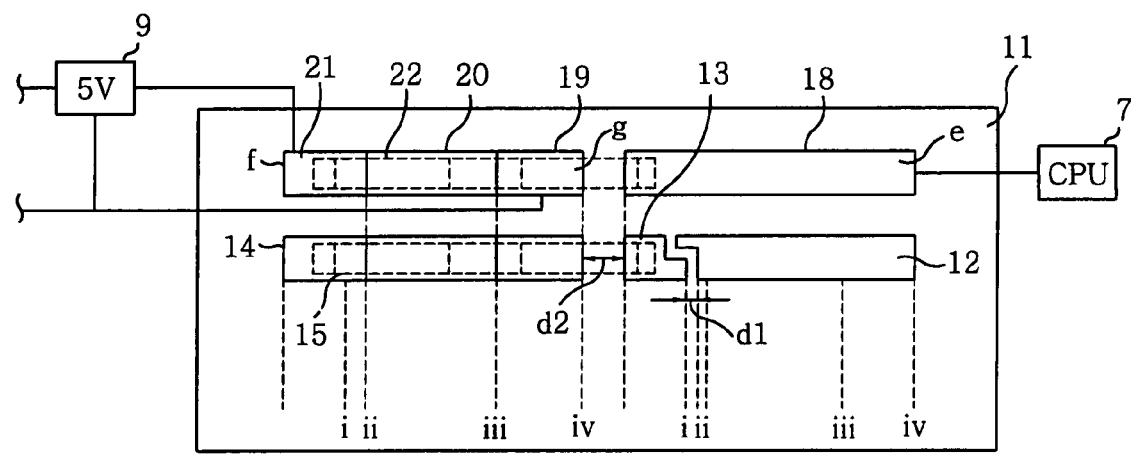
FIG. 5 is a view illustrating a changeover switch and a variable resistor for the switch device.
Figure 6:
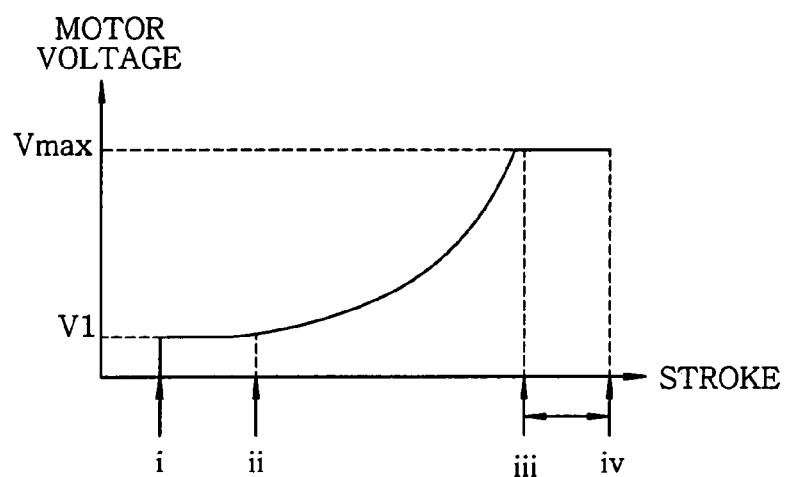
FIG. 6 is a graph illustrating a relationship between the stroke of a trigger switch and a voltage applied to a DC motor in the switch device.

FIG. 5 shows a planar shape of the conductor patterns 12, 13, and 14 formed on the base 11. The conductor patterns 12, 13, and 14 are band plates having an approximately same width. The conductor pattern 12, the conductor pattern 13, and the conductor pattern 14 are sequentially arranged from the right of FIG. 5. The conductor pattern 12 acts as the switching terminal a and is electrically connected to the connection point between the resistor R2 and the switching device SW3 (i.e., the output of the drive circuit 8). The conductor pattern 13 acts as the switching terminal b and is electrically connected to the negative terminal of the battery E.

The conductor pattern 12 is spaced apart from the conductor pattern 13 by an interval d1. The conductor pattern 12 has a narrow portion extending from one lateral end (i.e., an upper portion in FIG. 5) toward the conductor pattern 13, and the conductor pattern 13 has a narrow portion extending from the other lateral end (i.e., a lower portion in FIG. 5) toward the conductor pattern 12. The interval d1 has an approximately Z shape, when viewed in plan. The conductor pattern 14 acts as the common terminal c and is electrically connected to one terminal of the resistor R3 (i.e., an opposite side of the other switching device SW2). The conductor pattern 14 is spaced apart from the conductor pattern 13 by a greater interval d2 than the interval d1 and has approximately the same length as a sum of the lengths of the conductor patterns 12 and 13.

Figure 4:
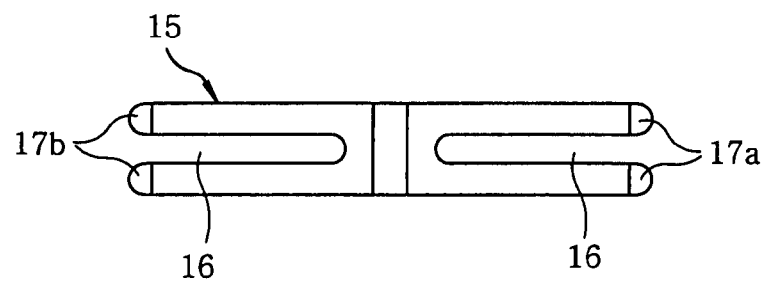
FIG. 4 is a plan view illustrating a sliding member for the switch device.

The sliding member 15 is a band-shaped elastic plate having slits 16 respectively formed in a longitudinal direction from both ends as shown in FIG. 4. The sliding member 15 has a substantially H shape, when viewed in plan. The two branches of the sliding member 15 are bent in a same direction (diagonally downward in FIG. 3), and ends of the branches are bent in an opposite direction (diagonally upward in FIG. 3). The sliding member 15 has an approximately an inversed U shape, when viewed from a side and has contacts 17a and 17b formed at both ends. The sliding member 15 is disposed to cover the conductor patterns 12 and 13 and the conductor pattern 14 and slide on the conductor patterns 12 to 14 in an arrangement direction of the conductor patterns 12 to 14 depending on the pressed amount of the trigger switch 6. The contact 17b is in contact with the conductor pattern 14 within an entire sliding range.

Meanwhile, the variable resistor VR includes conductor patterns 18, 19, and 21 having resistance of approximately zero and a resistor pattern 20 having a predetermined resistance formed on the surface of the base 11, and a sliding member 22 sliding on the base 11 in response to the pressing operation of the trigger switch 6.

FIG. 5 shows planar shapes of the conductor patterns 18, 19, and 21 and the resistor pattern 20 formed on the base 11. The conductor patterns 18, 19, and 21 and the resistor pattern 20 are band plates having an approximately same width. They are arranged in the order of the conductor patterns 18 and 19, the resistor pattern 20, and the conductor pattern 21 from the right of FIG. 5.

The conductor pattern 18 has approximately the same length as a sum of the lengths of the conductor patterns 12 and 13. The conductor pattern 18 acts as the terminal e of the variable resistor VR and is electrically connected to the input of the CPU 7. The conductor pattern 19 is spaced apart from the conductor pattern 18 by an interval d2. The conductor pattern 19 acts as the terminal g of the variable resistor VR and is electrically connected to the negative terminal of the battery E. The resistor pattern 20 is formed of a conductive material having a predetermined resistance and continuously from the conductor pattern 19 by a predetermined length.

The conductor pattern 21 is formed continuously from the resistor pattern 20. The conductor pattern 21 acts as the terminal f of the variable resistor VR and is electrically connected to an output of the 3-terminal regulator 9. That is, the conductor patterns 19 and 21 are electrically connected to each other via the resistor pattern 20. A total length of the conductor patterns 19 and 21 and the resistor pattern 20 is approximately same as the length of the conductor pattern 18.

Since the sliding member 22 is formed of the shape same as that of the sliding member 15, a description thereof will be omitted. This sliding member 22 is disposed to cover the conductor pattern 18 and the continuous three patterns 19, 20 and 21, and slides on the patterns 18 to 21 depending on the pressed amount of the trigger switch 6.

One contact of the sliding member 22 comes in contact with the conductor pattern 18 along the entire sliding range, and a point at which the other contact of the sliding member 22 is brought into contact with any one of the patterns 19 and 20 is moved in conjunction with the position of the trigger switch 6 as the trigger switch 6 is pressed. When the trigger switch 6 is released, the sliding member 22 is placed at a position indicated by a dotted line in FIG. 5 such that one contact of the sliding member 22 is in contact with the conductor pattern 18 and the other contact is in contact with the conductor pattern 21. In this state, the resistance of the variable resistor VR becomes approximately zero.

Operation of the switch device in accordance with the present embodiment of the present invention will be described. When the trigger switch 6 is released, the sliding member 15 is placed at a position as indicated by a solid line of FIG. 3 such that the contact 17a is in contact with the conductor pattern 13, and the other contact 17b is in contact with the conductor pattern 14. In this state, the changeover switch 10 is changed to the switching terminal b and the gate of the switching device SW2 is connected to the negative terminal of the battery E via the resistors R3 and R4. Further, the sliding member 22 is placed at a position as indicated by the dotted line of FIG. 5 such that one contact of the sliding member 22 is in contact with the conductor pattern 18 and the other contact is in contact with the conductor pattern 21, and the resistance of the variable resistor VR becomes approximately zero.

When the trigger switch 6 is pressed in this state, the sliding members 15 and 22 move to the right of FIG. 3 (and FIG. 5) depending on the pressed amount of the trigger switch 6. When the pressed amount of the trigger switch 6 exceeds a predetermined threshold value, the power switch SW1 becomes on but the contact 17a of the sliding member 15 does not reach a point i of FIG. 5 and is in contact with the conductor pattern 13 such that the changeover switch 10 remains in contact with the switching terminal b. Accordingly, even though the power voltage is supplied to the CPU 7 and the control signal is output from the CPU 7, the control voltage is not applied to the gate of the switching device SW2 and on/off of the switching device SW2 does not occur. That is, the switching device SW2 is forcibly turned off irrespective of the control signal from the CPU 7. Further, since the other contact of the sliding member 22 remains in contact with the conductor pattern 21, the resistance of the variable resistor VR is approximately zero.

Thereafter, when the contact 17a of the sliding member 15 moves to the right after passing the point i of FIG. 5 as the trigger switch 6 is further pressed, the contact 17a enters an area of the interval d1 such that it is separated from the conductor pattern 13 and brought into contact with only the conductor pattern 12. In this case, since the changeover switch 10 is switched to the switching terminal a and the gate of the switching device SW2 is connected to the output of the drive circuit 8 (i.e., the control circuit) via the resistor R3, the control voltage is applied to the gate of the switching device SW2.

When the contact 17a of the sliding member 15 passes the point i, the other contact of the sliding member 22 is brought into contact with the conductor pattern 12, and the resistance of the variable resistor VR is approximately zero. In this case, the CPU 7 outputs a control signal for minimizing the on-duty of the switching device SW2, based on the resistance of the variable resistor VR. The drive circuit 8 turns the switching device SW2 on/off in response to the control signal from the CPU 7 so that the voltage applied to the DC motor M becomes a minimum voltage V1 and the DC motor M rotates at a minimum speed.

Thereafter, as the trigger switch 6 is further pressed, the other contact of the sliding member 22 moves from the point ii of FIG. 5 to the point iii depending on the pressed amount, and the resistance of the variable resistor VR varies from approximately zero to the maximum value depending on a position where the contact of the sliding member 22 is brought into contact with the resistor pattern 20. At this time, the contact 17a of the sliding member 15 slides on the conductor pattern 12 so that the changeover switch 10 remains changed to the switching terminal a.

As the resistance of the variable resistor VR varies from approximately zero to the maximum value depending on the pressed amount of the trigger switch 6, the CPU 7 outputs a control signal of the on-duty dependent on the resistance of the variable resistor VR, the drive circuit 8 turns the switching device SW2 on/off based on the control signal from the CPU 7 so that the voltage applied to the DC motor M is controlled to a predetermined voltage value between the minimum voltage V1 and the maximum value Vmax. This allows the DC motor M to rotate at a desired rotational speed between a minimum speed and a maximum speed.

When the other contact of the sliding member 22 passes the point iii of FIG. 5 as the trigger switch 6 is further pressed, the resistance of the variable resistor VR becomes the maximum value while the contact moves from the point iii to the point iv corresponding to a full stroke. Accordingly, the on-duty of the switching device SW2 is controlled to the maximum value and the DC motor M rotates at a maximum speed.

Meanwhile, when the trigger switch 6 is released, it tries to return to an off position under a restoring force of a restoring spring (not shown) and the sliding members 15 and 22 move to the left of FIGS. 3 and 5. Until the other contact of the sliding member 22 reaches the point ii of FIG. 5 after passing the point iii, the resistance of the variable resistor VR varies from a maximum value to a minimum value depending on the pressed amount of the trigger switch 6. Accordingly, the CPU 7 changes the on-duty of the switching device SW2 from a maximum value to a minimum value. As a result, the rotational speed of the DC motor M returns from the maximum speed to the minimum speed.

When the other contact of the sliding member 22 moves to the left after passing the point ii of FIG. 5, the resistance of the variable resistor VR becomes approximately zero. Further, the CPU 7 controls the on-duty of the switching device SW2 to a minimum value. Thereafter, when the contact 17a of the sliding member 15 enters the area of the interval d1, is separated from the conductor pattern 12, and is brought into contact with only the pattern 13, the contact of the changeover switch 10 is changed from the switching terminal a to the switching terminal b and the gate of the switching device SW2 is connected to the negative terminal of the battery E via the resistors R3 and R4. Accordingly, the driving voltage applied to the gate is discharged via the resistors R3 and R4. At this time, since the switching device SW2 is forcibly turned off irrespective of the control signal from the CPU 7, exciting current is discharged through the DC motor M and the DC motor M stops.

Thereafter, when the pressed amount of the trigger switch 6 is below the predetermined threshold value, the power switch SW1 becomes off. At this time, since the switching device SW2 is turned off and current does not flow through the DC motor M, an arc is not generated and the lifetime of the contact of the power switch SW1 is prevented from being reduced. In addition, as the power switch SW1 is off, the voltage is not supplied from the 3-terminal regulator 9 to the CPU 7 and the CPU 7 does not operate.

As described above, in this embodiment, the stopping unit includes the changeover switch 10 that is controlled by the trigger switch 6. The changeover switch 10 forcibly turns the switching device SW2 off before the power switch SW1 is changed from on to off when the trigger switch 6 is released. Specifically, the changeover switch 10 connects the gate (i.e., the control terminal) of the switching device SW2 to the ground of the circuit (i.e., the negative terminal of the battery E) before the power switch SW1 is changed from on to off.

Accordingly, the control voltage input from the drive circuit 8 (i.e., the control circuit) to the control terminal of the switching device SW2 can be discharged in a short time so that the switching device SW2 can be forcibly off. This enables the power switch SW1 to be changed from on to off in the state where the switching device SW2 is certainly off, thereby preventing the contact of the power switch SW1 from being melt and stuck due to an arc, and increasing lifetime of the contact.

Furthermore, in this embodiment of the present invention, since there is no bypass switch connected in parallel with the switching device SW2 for bypassing the switching device SW2 when the trigger switch 6 is fully pressed, the supply of a power voltage to the DC motor M can be certainly blocked. For example, the current detecting unit is provided for detecting current flowing through the DC motor M. In the case where the current detecting unit detects overcurrent and the CPU 17 turns the switching device SW2 off based on the detecting result, when a bypass switch that is controlled by the trigger switch 6 is provided, the CPU 17 cannot turn the bypass switch off. Accordingly, the current flowing through the DC motor M cannot be entirely blocked. However, in this embodiment, since there is no bypass switch, the CPU 17 can certainly block the supply of a power voltage to the DC motor by turning the switching device SW2 off. Thus, the overdischarge of the battery can be prevented.

Second Embodiment

Figure 7A:
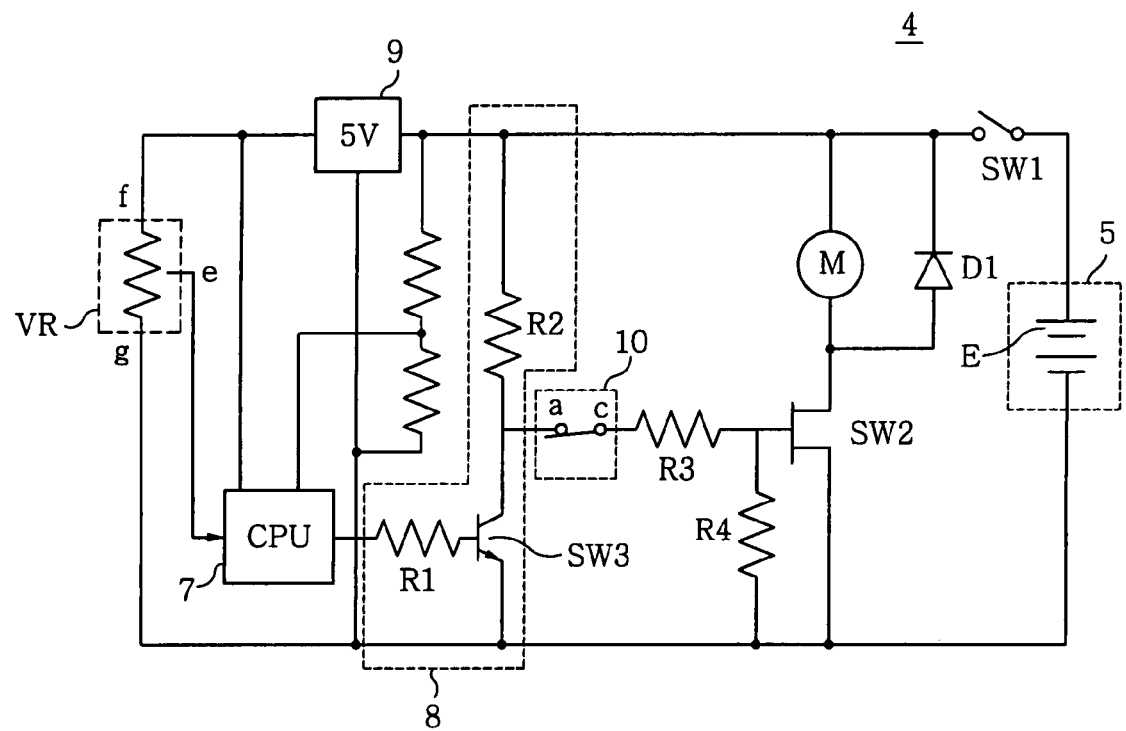
FIG. 7A is a circuit diagram illustrating an electric tool switch mechanism according to a second embodiment of the present invention.
Figure 7B:
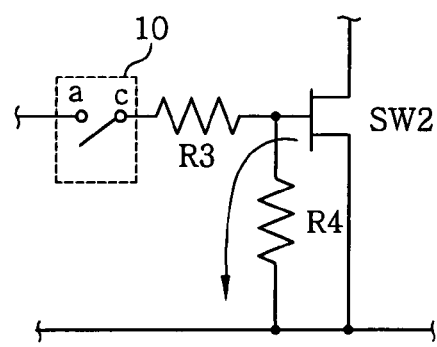
FIG. 7B is a circuit diagram illustrating a primary portion of the switch device.

A switching device according to a second embodiment of the present invention will be described with reference to FIGS. 7A and 7B. The switching mechanism of the second embodiment is the same as that of the first embodiment in the present invention except for the changeover switch 10 which serves as a stopping means in the first embodiment of the present invention. Accordingly, the same elements are referred to by the same reference numerals and a description thereof will be omitted.

In the first embodiment, the changeover switch 10 has the common terminal c and the two switching terminals a and b. However, in the second embodiment of the present invention, the changeover switch 10 has only two terminals, that is, a terminal c connected to the gate of the switching device SW2 via the resistor R3, and a terminal a connected to the output of the drive circuit 8. In the second embodiment, the changeover switch 10 can connect the gate (i.e., control terminal) of the switching device SW2 to the output of the drive circuit 8 (i.e., the control circuit) or block the electrical circuit between the gate and the output of the drive circuit 8 depending on the pressed amount of the trigger switch 6.

A detailed description of the changeover switch 10 will be omitted. The changeover switch 10 is obtained by removing the conductor pattern 13 (i.e., the switching terminal b), which is electrically connected to the circuit ground, from the changeover switch 10 of the first embodiment as shown in FIG. 3.

When the sliding member 15 moves to the left of FIG. 5 and the contact 17a of the sliding member 15 is separated from the conductor pattern 12 by releasing the trigger switch 6 after rotating the DC motor M by pressing the trigger switch 6, the changeover switch 10 becomes off. Accordingly, the state is shifted from the state where the gate of the switching device SW2 is connected the output of the drive circuit 8 to the state where the electrical circuit between the gate and the output of the drive circuit 8 is blocked. At this time, since the control voltage applied to the gate of the switching device SW2 is discharged via the resistor R4 of the discharging path, the switching device SW2 is forcibly turned off irrespective of the control signal of the CPU 7 such that exciting current is discharged through the DC motor M and the DC motor M stops.

Thereafter, when the pressed amount of the trigger switch 6 is below a predetermined threshold value, the power switch SW1 is turned off. At this time, since the switching device SW2 remains in an off state and current does not flow through the DC motor M, an arc is not generated and the lifetime of the contact of the power switch SW1 is prevented from being reduced. As the power switch SW1 is off, the power supply from the 3-terminal regulator 9 to the CPU 7 is blocked and the CPU 7 does not operate.

As described above, in the second embodiment of the present invention, the changeover switch 10 that is controlled by the trigger switch 6 blocks the electrical circuit between the gate of the switching device SW2 and the output of the drive circuit 8 before the power switch SW1 is changed from on to off when the trigger switch 6 is released. This allows the control voltage input from the drive circuit 8 to the control terminal of the switching device SW2 to be discharged in a short time via the discharging path so that the switching device SW2 is forcibly turned off. Accordingly, the power switch SW1 can be changed from on to off in the state where the switching device SW2 is certainly off, so that the generation of an arc is prevented and the lifetime of the contact can increase.

In the electric tool switch mechanism in accordance with the embodiments described above, the CPU 7 controls the control signal of the on-duty dependent on the pressed amount of the trigger switch 6 to set the rotational speed of the DC motor M depending on the pressed amount of the trigger switch 6. Alternatively, the CPU 7 may output a control signal of a predetermined on-duty when the trigger switch 6 is pressed above a predetermined threshold value, or the CPU 7 may turn the switching device SW2 on/off using a predetermined on-duty to rotate the DC motor M at a constant rotational speed.

While the invention has been shown and described with respect to the embodiments, it will be understood by those skilled in the art that various changes and modifications may be made without departing from the spirit and scope of the invention as defined in the following claims.

What is claimed is:

1. An electric tool switch mechanism comprising:
   a trigger switch for operating to at least rotate or stop a DC motor;
   a power switch connected between the DC motor and a battery power source and closed when a pressed amount of the trigger switch exceeds a predetermined threshold value;
   a switching device connected between the DC motor and the battery power source via the power switch;
   a control circuit for controlling to turn the switching device on/off using a desired on-duty when the pressed amount of the trigger switch exceeds the threshold value; and
   a stopping unit controlled by the trigger switch for forcibly turning the switching device off before the power switch is changed from on to off when the trigger switch is released.

2. The mechanism according to claim 1, wherein the stopping unit includes a changeover switch that is controlled by the trigger switch, and the changeover switch is configured to change, before the power switch is changed from on to off, a connection of a control terminal of the switching device, which is for receiving a control voltage from the control circuit, from an output of the control circuit to a circuit ground.

3. The mechanism according to claim 1, further comprising a discharging path for discharging a control voltage input from the control circuit to a control terminal of the switching device, wherein the stopping unit includes a changeover switch that is controlled by the trigger switch, and the changeover switch is configured to change, before the power switch is changed from on to off, a connection of a control terminal of the switching device from an output of the control circuit to a state where an electrical circuit between a control terminal and an output of the control circuit is blocked.

* * * * *